United States Patent
Clift et al.

(10) Patent No.: US 7,756,258 B2
(45) Date of Patent: Jul. 13, 2010

(54) COMMUNICATIONS SYSTEM WITH DIRECT ACCESS MAILBOX

(75) Inventors: David J Clift, Ipswich (GB); John G Johnston, Felixstowe (GB); Robert M Claxton, Woodbridge (GB); David J Borthwick, Ipswich (GB)

(73) Assignee: British Telecommunications plc, London (GB)

( * ) Notice: Subject to any disclaimer, the term of this patent is extended or adjusted under 35 U.S.C. 154(b) by 931 days.

(21) Appl. No.: 10/581,997

(22) PCT Filed: Dec. 10, 2004

(86) PCT No.: PCT/GB2004/005205

§ 371 (c)(1),
(2), (4) Date: Jun. 7, 2006

(87) PCT Pub. No.: WO2005/057895

PCT Pub. Date: Jun. 23, 2005

(65) Prior Publication Data

US 2007/0168428 A1    Jul. 19, 2007

(30) Foreign Application Priority Data

Dec. 11, 2003  (GB) ................ 0328758.8

(51) Int. Cl.
H04M 1/64  (2006.01)
(52) U.S. Cl. .......... 379/88.25; 379/88.13; 455/413
(58) Field of Classification Search ... 379/88.22–88.25; 455/413
See application file for complete search history.

(56) References Cited

U.S. PATENT DOCUMENTS

| | | | |
|---|---|---|---|
| 4,932,021 A | 6/1990 | Moody | |
| 4,987,587 A | 1/1991 | Jolissaint | |
| 5,128,981 A | 7/1992 | Tsukamoto et al. | |
| 5,220,599 A | 6/1993 | Sasano et al. | |
| 5,537,470 A | 7/1996 | Lee | |
| 5,631,948 A * | 5/1997 | Bartholomew et al. | ... 379/88.18 |
| 5,699,412 A * | 12/1997 | Polcyn | ............. 379/88.25 |
| 5,923,733 A | 7/1999 | Binns et al. | |
| 6,091,808 A | 7/2000 | Wood et al. | |
| 6,215,857 B1 | 4/2001 | Kasiviswanathan | |
| 6,289,084 B1 | 9/2001 | Bushnell | |
| 6,301,349 B1 | 10/2001 | Malik | |
| 6,327,344 B1 * | 12/2001 | Paxson | ............. 379/88.01 |

(Continued)

FOREIGN PATENT DOCUMENTS

EP    0802661 A2    10/1997

(Continued)

OTHER PUBLICATIONS

International Search Report dated Mar. 14, 2005.

(Continued)

*Primary Examiner*—Simon Sing
(74) *Attorney, Agent, or Firm*—Nixon & Vanderhye PC

(57) ABSTRACT

A communication system (1) in which a user (A) can elect to leave a message directly in the mailbox (11a) of another user (B) without calling or disturbing user (B). A store (database 7) is generated and maintained which identifies those users who are allowed direct access to the mailbox of user (B). The store is automatically updated whenever user (B) sends a communication to other users.

16 Claims, 9 Drawing Sheets

U.S. PATENT DOCUMENTS

| | | |
|---|---|---|
| 6,327,359 B1 | 12/2001 | Kang et al. |
| 6,549,619 B1 | 4/2003 | Bell et al. |
| 6,687,242 B1 | 2/2004 | Enzmann et al. |
| 6,792,102 B2 | 9/2004 | Shires |
| 2002/0057677 A1 | 5/2002 | Katzschner et al. |
| 2002/0110224 A1 | 8/2002 | Kovales et al. |
| 2002/0118811 A1 | 8/2002 | Davis et al. |
| 2002/0126805 A1 | 9/2002 | Finnigan |
| 2003/0009434 A1 | 1/2003 | Munn et al. |
| 2003/0041303 A1 | 2/2003 | Milton |
| 2003/0099341 A1 | 5/2003 | Williams |
| 2003/0169866 A1 | 9/2003 | Williams et al. |
| 2004/0235520 A1 | 11/2004 | Cadiz et al. |
| 2004/0266414 A1 | 12/2004 | Likwornik |
| 2004/0266415 A1 | 12/2004 | Belkin et al. |
| 2005/0063530 A1 | 3/2005 | Cook et al. |
| 2005/0105705 A1 | 5/2005 | Elcock et al. |
| 2005/0166154 A1 | 7/2005 | Wilson et al. |
| 2005/0249344 A1 | 11/2005 | Mueller et al. |
| 2009/0136012 A1 | 5/2009 | Boyd et al. |

FOREIGN PATENT DOCUMENTS

| | | | |
|---|---|---|---|
| EP | 0 869 688 A2 | 10/1998 | |
| EP | 1 122 938 A1 | 8/2001 | |
| EP | 1229750 A1 | 8/2002 | |
| EP | 1 169 866 A2 | 1/2006 | |
| JP | 2001189803 | 7/2001 | |
| WO | 97/37499 | 10/1997 | |
| WO | WO 99/27700 | 6/1999 | |
| WO | 01/19059 A1 | 3/2001 | |
| WO | 01/59595 A2 | 8/2001 | |
| WO | 02/25403 A2 | 3/2002 | |
| WO | WO 03/47230 A1 | 6/2003 | |
| WO | 2004/054209 A2 | 6/2004 | |
| WO | 2006/103427 A1 | 10/2006 | |

OTHER PUBLICATIONS http://theregister.co.uk/content/5/32999.html.

International Search Report mailed Aug. 16, 2006 in PCT/GB2006/001145.

Rabiner L., et al., "Application of Isolated Word Recognition to a Voice Controlled Repertory Dialer System," IEEE International Conference on Acoustics, Speech, and Signal Processing, ICASSP '80, vol. 5, Apr 1980, pp. 182-185.

International Search Report for PCT/GB2007/000694 mailed Aug. 22, 2007.

U.S. Appl. No. 12/294,251, Boyd, et al., filed Sep. 24, 2008.

* cited by examiner

COMMUNICATIONS SYSTEM WITH DIRECT ACCESS MAILBOX

This application is the U.S. national phase of international application PCT/GB2004/005205 filed 10 Dec. 2004 which designated the U.S. and claims benefit of GB 0328758.8, dated 11 Dec. 2003, the entire content of which is hereby incorporated by reference.

The present invention relates generally to telecommunications systems, and in particular to systems in which a user can elect to leave an audio-visual message directly in the mailbox of the called subscriber.

Within the field of audio-visual communication, a system may be designed such that a subscriber (user) can choose not to telephone or make a video call which disturbs another user, but can instead elect to leave a voicemail (or videomail) message which the other user can collect when convenient. This is particularly useful when it is known that the other user is likely to want to not be disturbed (for example because it is very late at night) or because they do not want to bother the user with a social telephone call during working hours (or vice versa). However, with this mail facility, it is likely that the owner of the mailbox will want to have control over who is allowed or not allowed to access their mailbox, and when they are allowed to access it.

PRIOR ART

U.S. Pat. No. 6,215,857 entitled "System, Method and Apparatus for Direct Voice Mail Access and Blocking" discloses a telecommunications system in which a calling subscriber A is able to directly connect with the voice mailbox for a called subscriber B without disturbing the called subscriber B (this is referred to as DVMA, Direct Voice Mail Access). Subscriber A indicates his desire to directly connect with the voice mailbox by dialling a prefix (service code) before the telephone number. The prefix is detected by his local switch and causes it to send an indicator associated with the call in the Initial Address Message (IAM) (to show that DVMA has been requested) to the destination switch. This arrangement for Direct Voice Mail Access requires that ISUP (Integrated Services User Part) signalling protocol is supported in the network down to the local switch.

In addition, in order to give subscriber B control over the direct access to his voice mailbox, the DVMA feature can be activated, deactivated or temporarily blocked by subscriber B dialling the appropriate service codes. Thus, subscriber B can control when direct access to their voice mail is or is not possible for callers. In addition, not all subscribers are allowed direct access, and therefore a list is maintained by subscriber B which identifies the subscribers who are allowed (or not allowed) direct access to the voice mailbox. This list is generated and maintained by subscriber B, who must dial the appropriate service codes and directory numbers for the subscribers in order to add or remove numbers from the list.

United States Patent Application published under No. US 2003/0099341 entitled "Method and System for providing access to a Voice mail System" also discloses a telecommunications system in which a calling subscriber A is able to directly connect with the voice mailbox for a called subscriber B without disturbing the called subscriber B. In this system, an intermediary service (a Directory service) is required to provide the appropriate access numbers—i.e. the number for the voice mail system and the number for the called party—before the application can set up the call as a "redirected call" with these as the parameters to send to the voice mail system. Upon receipt of the call, the voice mail system determines, from the information contained in the call, the voice mailbox of the subscriber B to whom the call is directed. In alternative arrangements, instead of using the directory service, the call to a specific voice mailbox can be set up from an icon on a world-wide web page, or in response to an email from a third party. However, this system provides no means for the called party to control who is allowed direct access to their mailbox.

SUMMARY OF THE INVENTION

The present invention seeks to provide an improved method and system for direct access to a mailbox for a subscriber.

According to a first aspect of the present invention, there is provided a method of operating a communications system in which a first user can elect to send an audio-visual communication directly to a mailbox of a second user, the method comprising the steps of:

(a) maintaining a store associated with the second user, the store comprising entries indicating a plurality of other users who are allowed or not allowed to send an audio-visual communication directly to the mailbox of the second user;

(b) upon sending of a communication from the second user to any destination user, automatedly performing a store modification procedure with respect to the entry associated with the destination user;

(c) upon receiving a request from the first user desiring to send an audio-visual communication directly to the mailbox of the second user:

checking the store to determine whether the first user is allowed to send an audio-visual communication directly to the mailbox of the second user; and accordingly allowing or not allowing the communication to the mailbox.

This invention therefore relates to a system in which a user can elect to send audio-visual communications directly (i.e. without ringing or disturbing the called party) to a mailbox of, another user, such as for example a telephone or video call which would otherwise be directly connected to allow the users to converse. In order to help determine whether a call is from a user who is allowed to connect directly to the mailbox, a store is maintained which comprises entries indicating a plurality of those other users. This store might comprise, for example, a list of telephone numbers of only those users who are allowed to access the mailbox, or could alternatively comprise a list of numbers giving both allowed and non-allowed callers. Whilst regular telephone numbers (e.g. according to the International Telecommunication Union standard ITU-T E.164) are used in the specific embodiments, it is understood that the entries could comprise any suitable indicator associated with a user or device which they use. When an incoming request is received indicating that a user desires to send an audio-visual communication directly to the mailbox, the store is checked to see whether that user is allowed and the communication is accordingly accepted or refused.

In order to update the store, when a communication is sent from the second user to any destination user, the system automatedly performing a store modification procedure (i.e. it follows a predefined set of rules stored in the system) with respect to the entry associated with the destination user. The store modification procedure may comprise adding into the store an entry (such as the telephone number) associated with the destination user (i.e. it is understood here that it may be the case that there was previously no entry at all for this user in the store), or alternatively modifying or deleting an entry already present.

The step in (b) according to the first aspect of the invention, of sending a communication to any destination user (for example, the second user making a phonecall) may comprise associating with the communication a signal caused by the second user. This signal indicates whether or not the destination user will be allowed to send an audio-visual communication directly to the mailbox of the second user. Thus, for example, the user may prefix the dialled telephone number with extra digits to indicate explicitly in a convenient way whether or not they want the user they are calling to have direct access to their mailbox.

The store modification procedure may comprise:
  detecting a signal associated with the communication that indicates whether or not the destination user is to be allowed to send audio-visual communications directly to the mailbox; and
  performing subsequent steps in the store modification procedure on the basis of that signal.

This aspect conveniently allows the communications system to detect any signals indicating whether the destination user for that particular communication should in the future be allowed to have direct access to the mailbox (e.g. the signal might be a prefix dialled by the second user or a button pressed on a window-based graphical interface to indicate the user's preferences), and the system can act accordingly on the basis of that signal to modify the store (for example, by adding or deleting telephone numbers from the store).

The signal may conveniently comprise an inhibition signal which indicates that the second user does not want the destination user to be allowed to send audio-visual communications directly to the mailbox; and the subsequent steps in the store modification procedure comprises inhibiting any amendment of the store. In this case, the user is able to indicate that the person they are calling should not be allowed to have direct access to their mailbox, and the store modification procedure in this particular case will not involve amending the store (e.g. where the number for the called user is not in the store, then it will not be added into the store).

According to a second embodiment of the invention, there is provided a communications system in which a first user can elect to send an audio-visual communication directly to a mailbox of a second user, the system comprising:
  (a) a store associated with the second user, the store comprising entries indicating a plurality of other users who are allowed or not allowed to send an audio-visual communication directly to the mailbox of the second user;
  (b) a device associated with the second user, the device being arranged to send a communication from the second user to any destination user, and upon such sending the device being further arranged to automatedly perform a store modification procedure with respect to the entry associated with the destination user; and
  (c) the system being arranged, upon receiving a request from the first user desiring to send an audio-visual communication directly to the mailbox of the second user, to check the store to determine whether the first user is allowed to send an audio-visual communication directly to the mailbox of the second user; and the system accordingly allowing or not allowing the communication to the mailbox.

According to a third aspect of the invention, there is provided a method of controlling the access a calling party has to the communications message store of a called party, the method comprising the following steps: determining the identity of the calling party; determining from one or more stored records of identities associated with the communications store, if the identity of the calling party is an identity entitled to have direct access to the communications message store, wherein each of said one or more stored records is associated automatically with the identity of a party previously called by the called party; and if the identity of the calling party is not associated in any one of said stored records, preventing the calling party from storing a communications message in said communications message store.

In one embodiment, the communications message store is a multi-media communications mail-box.

In one embodiment, each stored record contains information identifying the party previously called by the called party which was captured automatically while on-ward connecting a call from the called party to the party.

The aspects of the invention may be combined with each other and/or with any of the features set out in the above embodiments of the invention and in the accompanying dependent claims in any suitable manner apparent to those skilled in the art.

DETAILED DESCRIPTION

For a better understanding of the present invention, specific embodiments will now be described with reference to the accompanying drawings, in which like numerals refer to like features, and in which.

Figure 1:
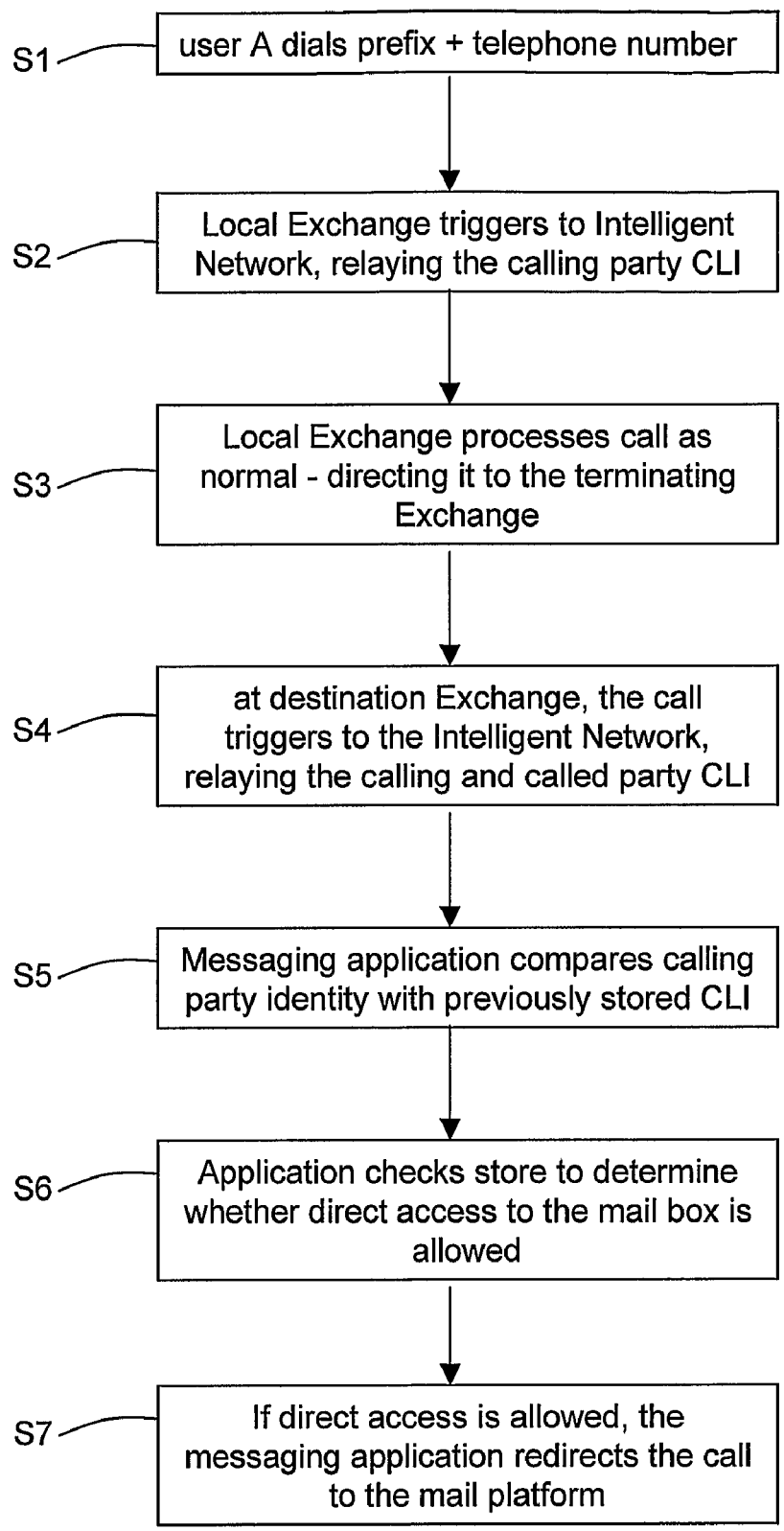
FIG. 1 shows a flow chart for a first procedure for sending a communication directly to the mailbox of a user.
Figure 2:
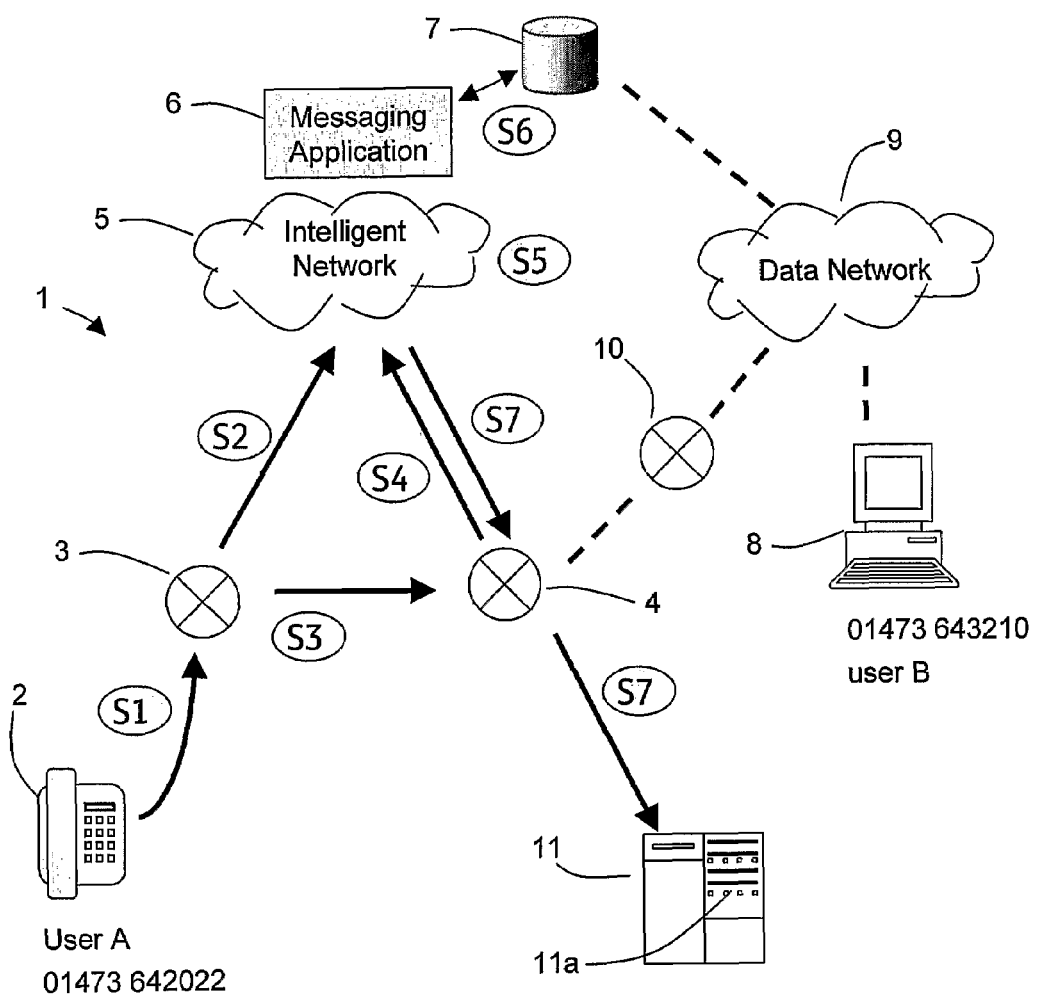
FIG. 2 shows a schematic view of a first system suitable for sending a communication directly to the mailbox of a user.

FIGS. 1 and 2 illustrate an associated procedure and communication system 1 in which a first user (A) of a communication device 2 can elect to send an audio-visual communication directly to a mailbox 11a of a second user (B). The first user (A) of communications device 2 (a telephone) is, in the arrangement illustrated in FIG. 2, connected in a conventional manner to a public switched telephone network (PSTN) via a digital local exchange (DLE) 3. The PSTN network comprises a multiplicity of exchanges as is conventionally known in the art, but for clarity only one other is illustrated in FIG. 2, DLE 4. The Local Exchanges such as 3 and 4 operate to perform all the basic call processes associated with setting up a connection between different devices connected to the PSTN network, and in order to provide additional functionality, pass the control at appropriate times to service control points, SCP (not shown) in Intelligent Network 5. In the specific arrangement illustrated in FIG. 2, a messaging application 6 is provided as part of the Intelligent Network, and connected to database 7 containing caller profiles.

User B is able to make telephone or video calls to the PSTN network via a second device, which in the specific embodiment is a personal computer 8. The computer is connected to data network 9 (e.g. the Internet), and is able to break out calls to the PSTN network via a VoIP (Voice over Internet Protocol) gateway 10 connected to Local Exchange 4.

User A can elect to send an audio-visual communication directly to the mailbox of user B, and the procedure is as follows: In step S1, user A decides they would like to leave a voice mail message for user B and uses telephone 2 to dial a three digit prefix [171] followed by the telephone number [01473 643210] they would usually dial to reach user B. The digits are collected by Local Exchange 3 as they are dialled. In step S2, Local Exchange 3 recognises the three dialled digits of the prefix which indicate that this is a direct mailbox access (DMA) call, and triggers automatically to the Intelligent Network (IN). At this stage, the subsequent digits dialled by user A are still being collected by the Exchange and are therefore not available for sending to the IN. However, the calling line identifier (CLI) for device 2 used by user A is known by the Exchange 3 at this stage, and this CLI is relayed to the Intelligent Network together with an indication that this caller is requesting direct access to a mailbox. The Intelligent Network messaging application stores the CLI for calling party A for later use.

In step S3, Local Exchange 3 continues to process the call as normal. It removes the three prefixed digits, and directs the call to the appropriate terminating Exchange 4 which is identified as serving the called party (user B). At the terminating Exchange 4, a trigger has been set based on the destination line for user B so that all calls to this line trigger automatically to the Intelligent Network, step S4, in this case relaying both the calling party and called party CLIs. In step S5, control has been passed to the Intelligent Network, in which the IN messaging application 6 compares the identity of the calling party with the CLI recorded earlier, to determine whether this caller has requested direct access to the mailbox. If so, then at step S6, the messaging application consults the contents of database 7 to determine whether this caller is allowed direct access to the mailbox of user B.

In the specific embodiment, database 7 is a store which holds a list of caller profiles. This comprises a list of entries which identify a number of users who are allowed direct access to the mailbox of user B, and the system performs step S6 by checking that the CLI for the calling party is present in this database list. However, the database may additionally include entries associated with users who are not allowed direct access to the mailbox, or a more complicated series of entries giving specific dates/times when direct access to the mailbox is allowed for various users. In these cases the procedure for checking whether direct access is allowed would vary according to the format of the information stored in the database In the specific embodiment, the entries in the database relate to the standard telephone numbers associated with the users, since these can be easily be compared against the calling line identifiers presented by the current service. However, it is understood that any other suitable identification criteria associated with the users or the devices which they use could be stored instead (for example, if needed to support other network types), such as IP (internet protocol) addresses or SIP (session initiation protocol) addresses.

If the messaging application 6 determines by consulting database 7 that user A is allowed direct access to the mailbox of user B, then at step S7 the IN messaging application redirects the call to the appropriate mail platform 11, and user A is allowed to leave a voicemail message in the mailbox 11*a* on the platform.

If, when the database is consulted at step S6, it is determined that user A is not (at the present time) allowed direct access to the mailbox of user B, then the messaging application directs the call to an IVR (Interactive Voice Response) platform where, under the control of the Intelligent Network, an appropriate recorded message is played to indicate that "the service is not available", and the call is torn down.

Figure 3:
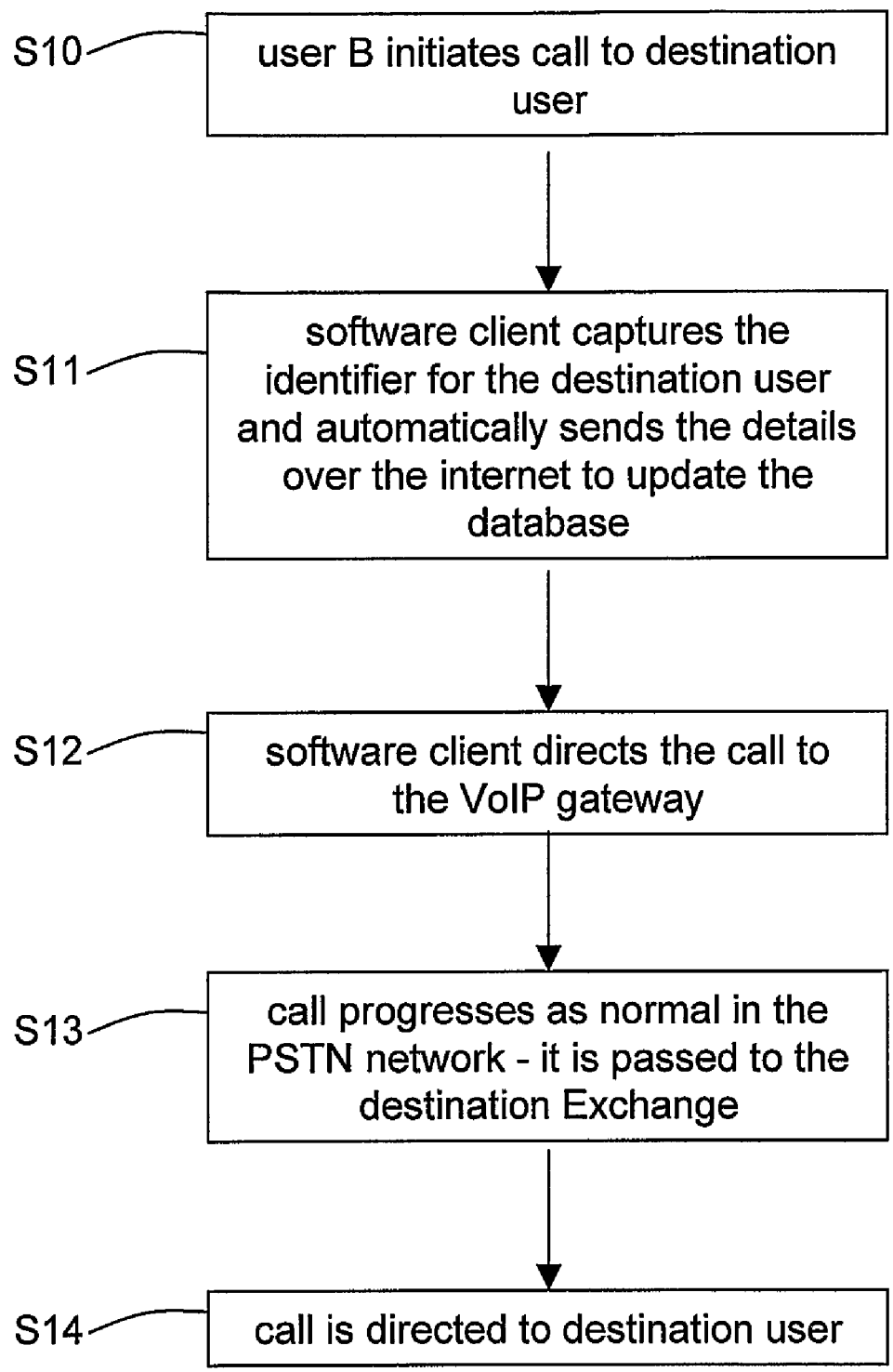
FIG. 3 shows a flow chart of a procedure for automatically updating a database of caller profiles.
Figure 4:
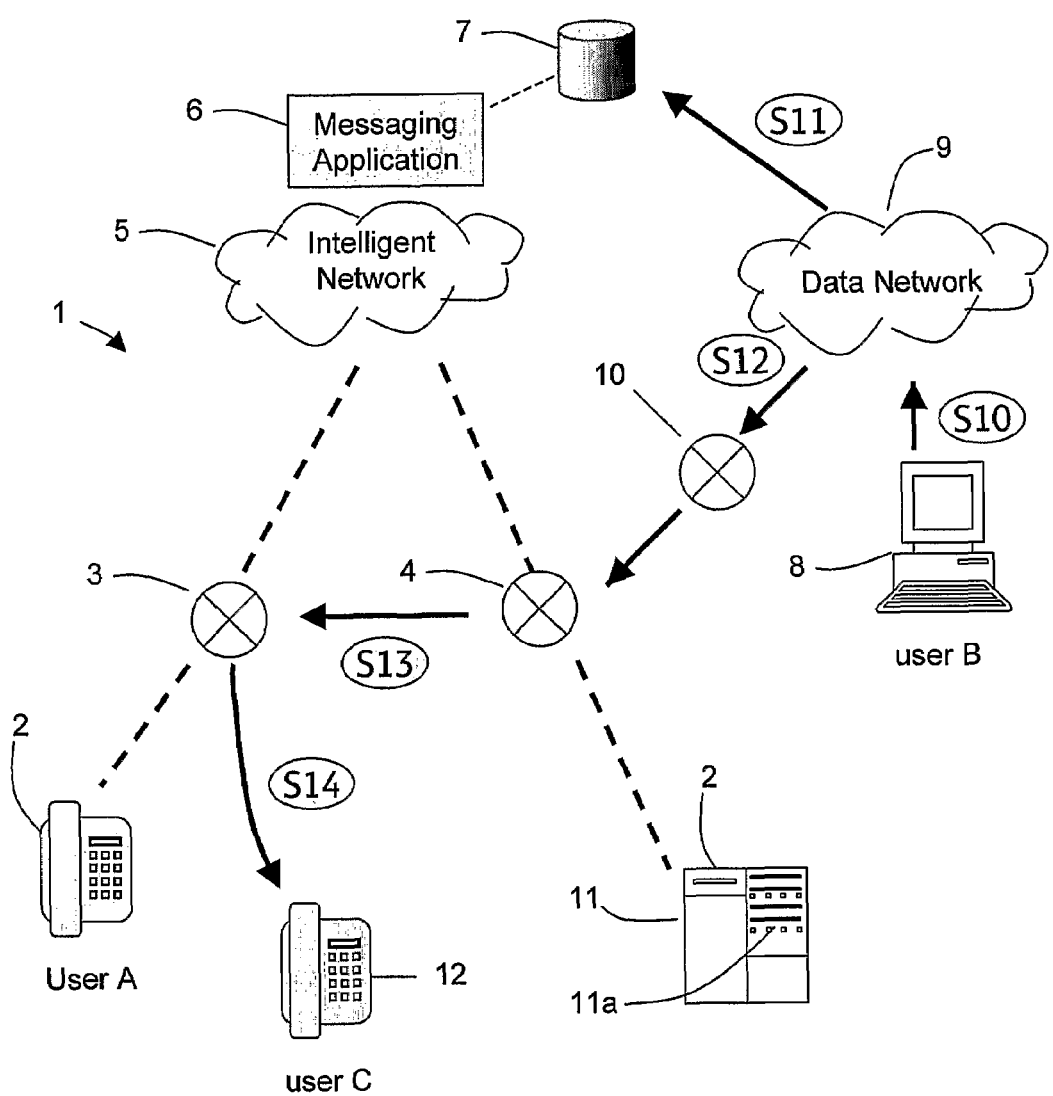
FIG. 4 shows a schematic view of a system suitable for automatically updating a database of caller profiles.

FIGS. 3 and 4 illustrate an associated procedure and communication system in which the act of user B sending a communication to any destination user causes an automatic update procedure to be performed for the database 7 of caller profiles. User B's device 8 can be any device suitable for sending audio and/or visual communications to other users, and in this particular example it comprises a personal computer of the type conventionally known in the art. On the computer 8, a software communication client operates for managing the communications made by user B. For example this software client allows user B to initiate VoIP (voice over Internet Protocol) to VoIP calls, or VoIP to PSTN calls, it contains an address book, maintains a record of all incoming and outgoing calls, operates internet call waiting, and allows the user to control their communications via a graphical user interface.

In step S10, user B decides that they would like to communicate with another user, and uses the software client to initiate the call, which can be in one of a various number of ways. For example, the user may select from an address book presented via the graphical user interface, after which the software client will automatically dial the correct number to connect to the selected user. Alternatively the user may choose to input the number themselves using the keyboard of the computer or an IP phone keypad. As a further option, instead of user B utilising the facilities (e.g. a microphone/video camera) of the computer to make the call, they may choose to use the computer as a third party to set up a call for them between their chosen telephone and the destination user, in which case the software client will control the simultaneous dialling of both numbers and then connect them together for the call. In any event, whenever user B makes an outgoing call, the software client captures the identifier for the destination user and sends the details over the internet to database 7 to perform an automatic update procedure, step S11.

In step S12, the software client then processes the call as normal. In this case it involves calling a PSTN user so the call is directed to the VOIP gateway 10 to access the PSTN network. In step S13, the call progresses as a typical PSTN call from Local Exchange 4 to destination Exchange 3. At step S14 the call is finally directed to communication device 12 (for example, a telephone) of the destination user C.

Figure 5:
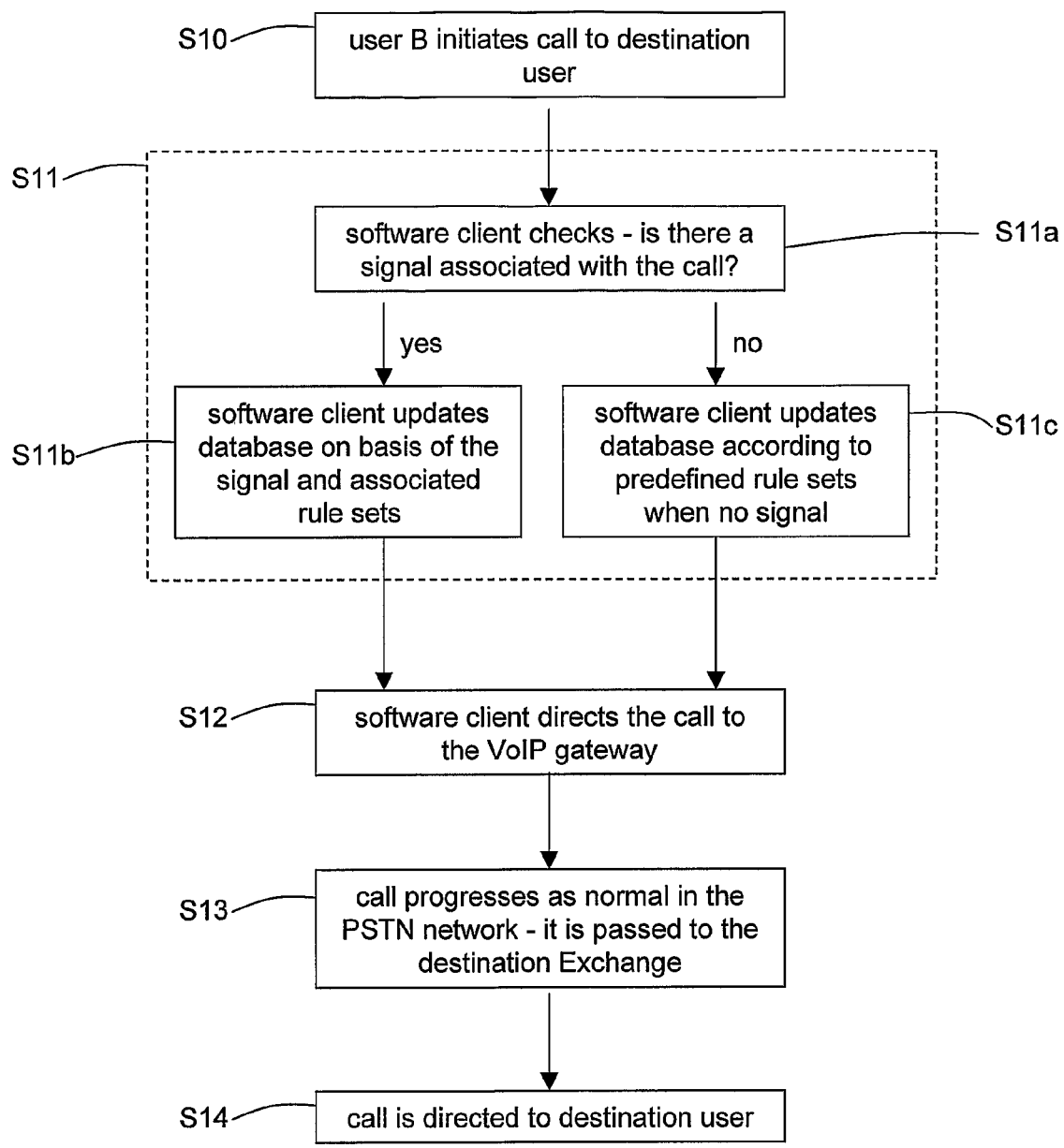
FIG. 5 shows a flow chart of a second procedure for automatically updating a database of caller profiles.

It is understood that the software client is designed to operate in step S11 with regard to capture of the numbers and update of the database 7 according to a predefined set of rules. For the procedure of FIG. 3, the rules specify that all outgoing called numbers are automatically updated onto the database to indicate users who are allowed direct access to the mailbox of user B. However, other predefined rules are possible according to user requirements, and an alternative procedure is shown in FIG. 5, in which much of the procedure is identical to FIG. 3, but step S11 has been expanded to show additional procedural steps.

In step S10, user B utilises the software client to initiate the call to the destination user as before. In step S11*a*, the software client checks for a signal associated with the call, which indicates whether or not the destination user is to be allowed to send direct mailbox access (DMA) calls. If there is such a signal, then the software client determines according to its predefined rule set how it should update the database on the basis of that signal, step S11b. This signal may have been generated, for example, by the user "clicking" a button on the graphical user interface to indicate explicitly that they do not want the person they are calling to have direct access to their mailbox. Alternatively, the user may choose to enter a prefix for the call using the keyboard or IP phone keypad before entering the remaining digits for the call. Any of these methods causes a signal to be associated with the call the user is making, which the software client is able to detect and act on accordingly. In this case, the client can be programmed to perform a number of options, including (i) to not modify the database (ii) to check to see if the identified user is already in the database as an allowed user and delete their entry (iii) to ensure there is an entry in the database which indicates that this user is not allowed direct access to the mailbox.

After performing the relevant database modification procedure (which may, of course, not involve any actual amendment to the database if this user is not to be added) the software client then processes the call as normal through steps S12-S14 as described for FIG. 3.

Even if, at step S11a the client determines there is no signal associated with the call, it will still work through it's predefined set of database modification rules (step S11c) which determine whether or not it will amend the database according to user preferences.

In addition, a web application is provided which allows the user of computer 8 to remotely access the database 7 over the Internet in order to maintain and update their direct caller preferences. Thus, users can manually amend database entries at any time via the web application, to indicate those callers who they do or do not want to have direct access to their mail box.

Figure 6:
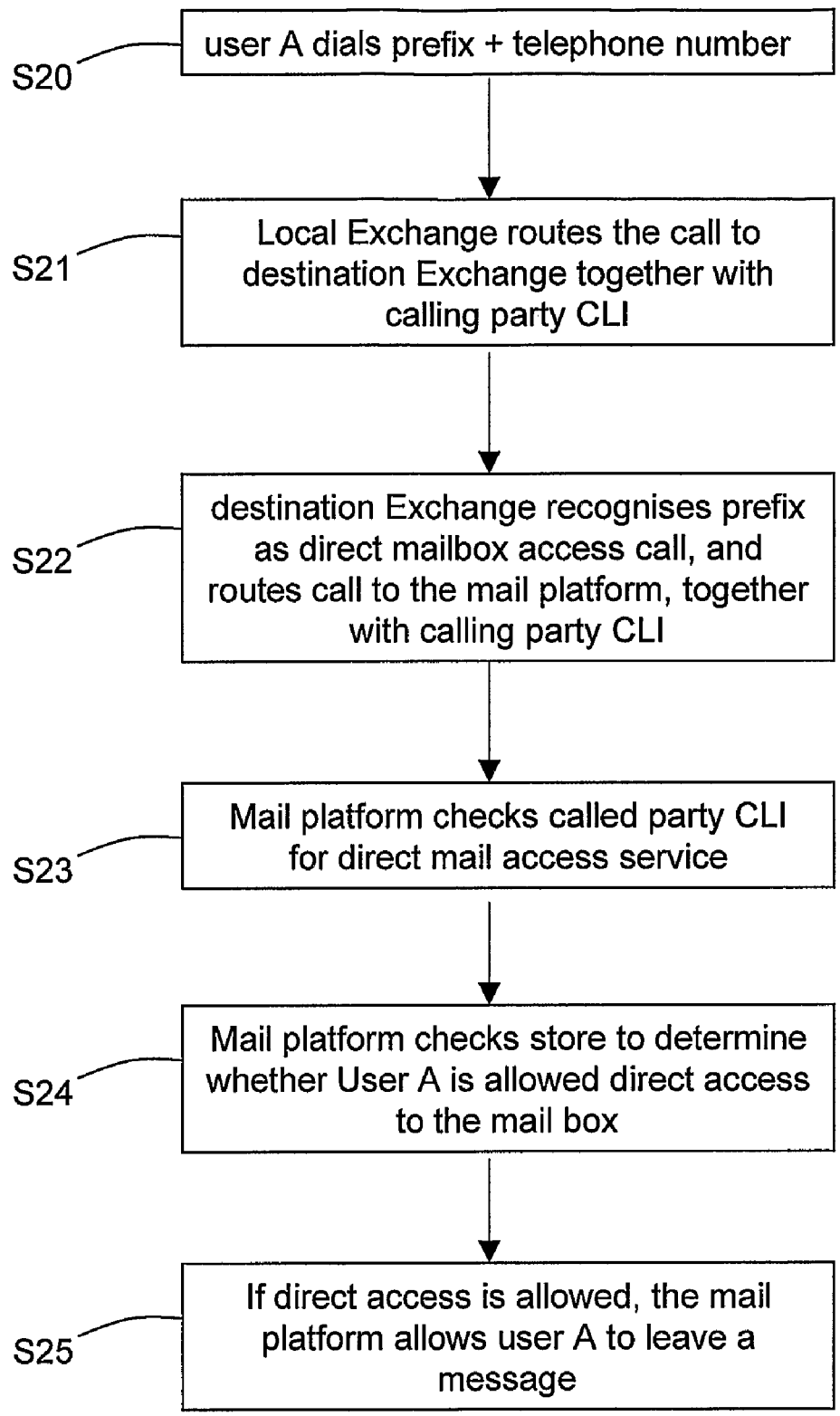
FIG. 6 shows a flow chart for a second procedure for sending a communication directly to the mailbox of a user.
Figure 7:
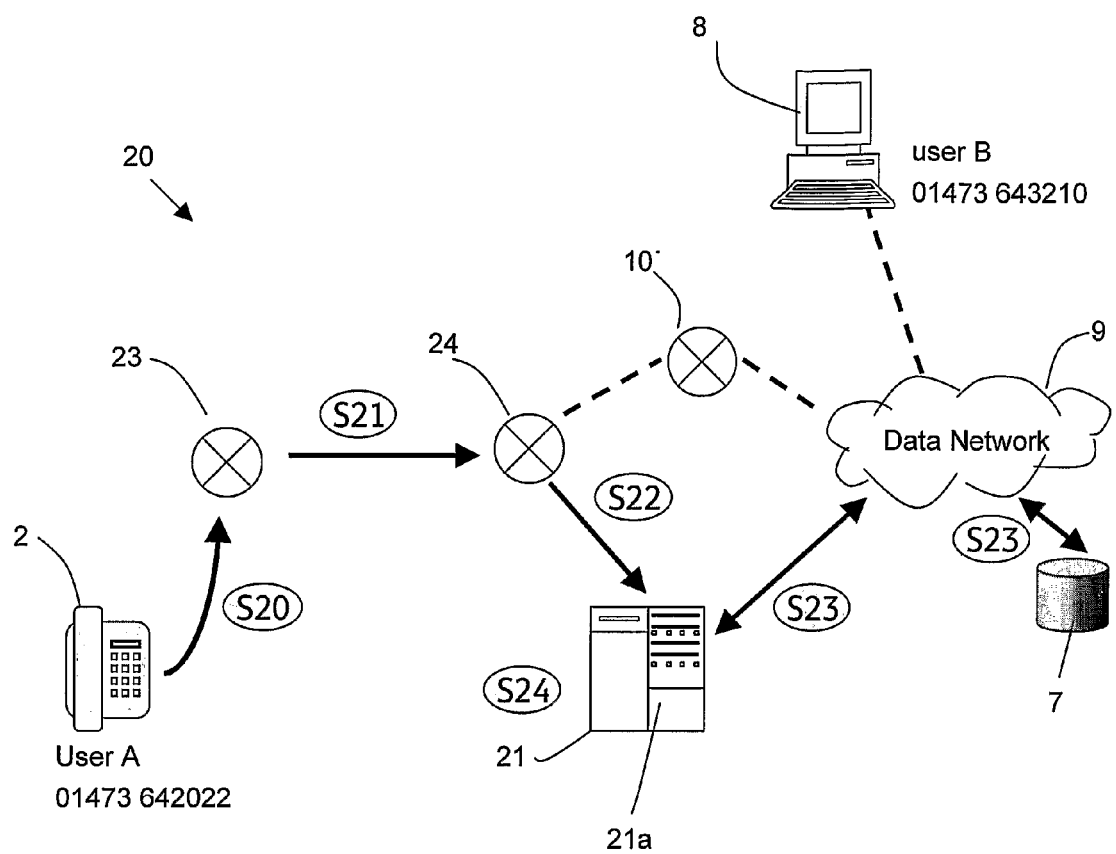
FIG. 7 shows a schematic view of a second system suitable for sending a communication directly to the mailbox of a user.

Whilst FIG. 2 showed a first example of a system in which a first user can send an audio-visual communication directly to the mailbox of a second user, FIG. 7 shows an alternative arrangement of a system in which this can also be performed. FIGS. 6 and 7 show a second embodiment of a procedure and communication system 20 in which a first user (A) of a communication device 2 can elect to send an audio-visual communication directly to a mailbox 21a of a second user (B). User A's telephone 2 is connected in a conventional manner to a public switched telephone network (PSTN) via a digital local exchange (DLE) 23. The PSTN network comprises a multiplicity of exchanges as is conventionally known in the art, but for clarity only one other is illustrated in FIG. 7, DLE 24.

In step S20, user A decides they would like to leave a voice mail message for user B and uses telephone 2 to dial a three digit prefix [171] followed by the telephone number [01473 643210] they would usually dial to reach user B. The digits are collected by Local Exchange 23 as they are dialled. In step S21, Local Exchange 23 recognises the 171 as a prefix, strips the subsequent 0, and routes the call to destination Exchange 24 on the basis of the digits 171 1473. In this embodiment, the network has been designed with a numbering system in which calls are allowed to have a special routing prefix 171. This identifies the call as a DMA call, but the call will be routed to the same DLE as the original code would be (i.e. dialling 171 01473 . . . will cause the call to be routed to the same DLE as dialling 01473 . . . ). The call is routed to the destination exchange together with the calling party (A)'s CLI.

At the destination Exchange 24, the 171 prefix is recognised as indicating a DMA call. The DLE 24 determines (from locally held data) which mail platform serves the called party, and routes the call to a mail platform 21 (step S22) together with the calling party CLI and the prefix to indicate that the call is a DMA call. At the mail platform, the called party CLI is checked to determine whether DMA is allowed at all for that user (step S23). If so, the platform accesses the contents of database 7 over a data network 9 to determine whether the calling party (user A) is allowed direct access to the mailbox of user B (step S24). As described earlier, database 7 is a store which holds a list of caller profiles, including entries which indicate a plurality of users who are allowed or not allowed to send an audio-visual communication directly to the mailbox of B. If the mail platform determines that user A is allowed direct access to the mailbox of user B, then at step S25 user A is allowed to leave a voicemail message in mailbox 21a of the mail platform.

If, at step S22 the terminating Exchange 24 cannot identify a mail platform for the called party, it deduces that the called party has not subscribed to a mail service, plays an appropriate recorded message to indicate that "the service is not available", and the call is torn down. Similarly, if the mail platform determines at step S23 that user B does not currently allow DMA calls at all, or at step S24 that user A is not one of the users allowed direct access to the mailbox, the "the service is not available" message is played, and the call is torn down.

Figure 8:
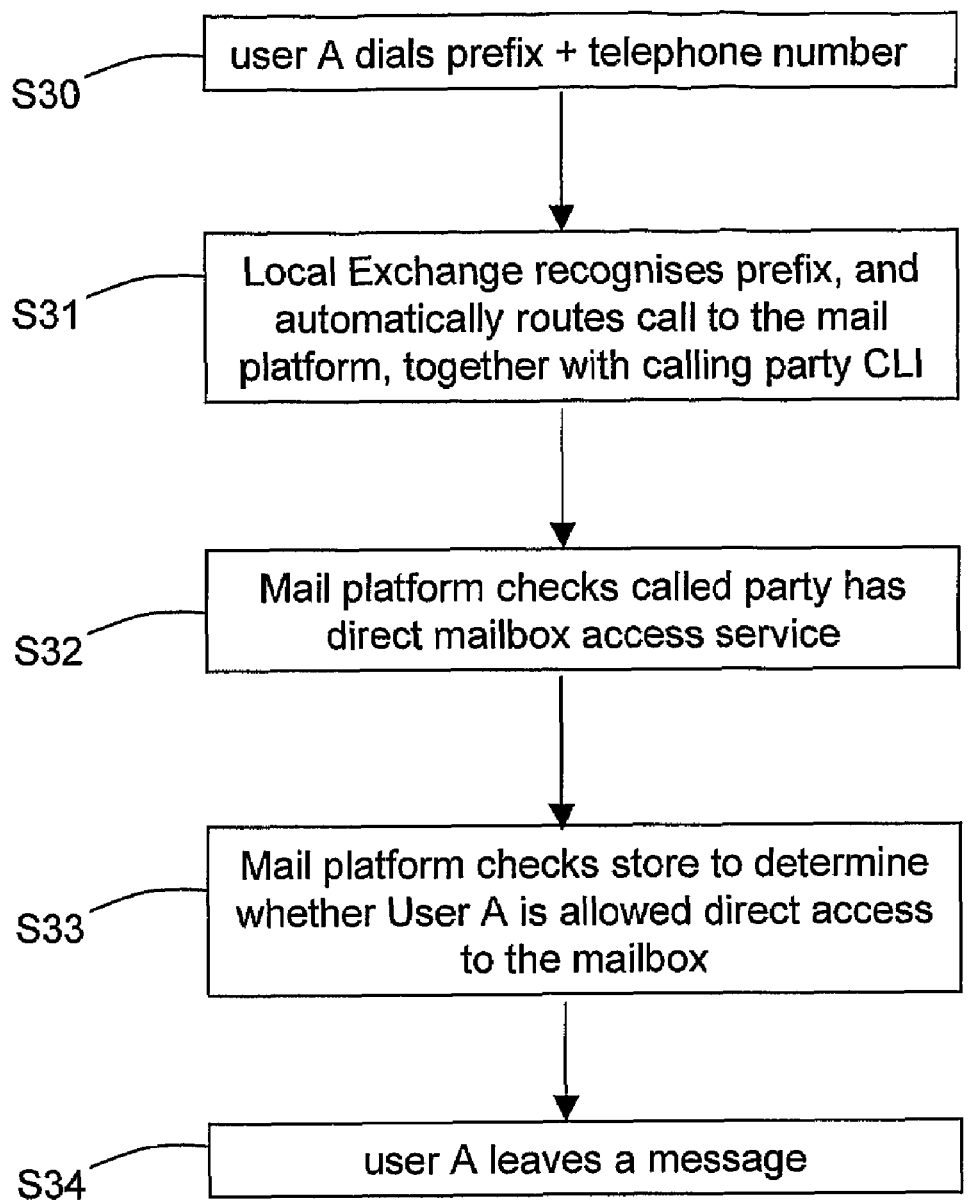
FIG. 8 shows a flow chart for a third procedure for sending a communication directly to the mailbox of a user.
Figure 9:
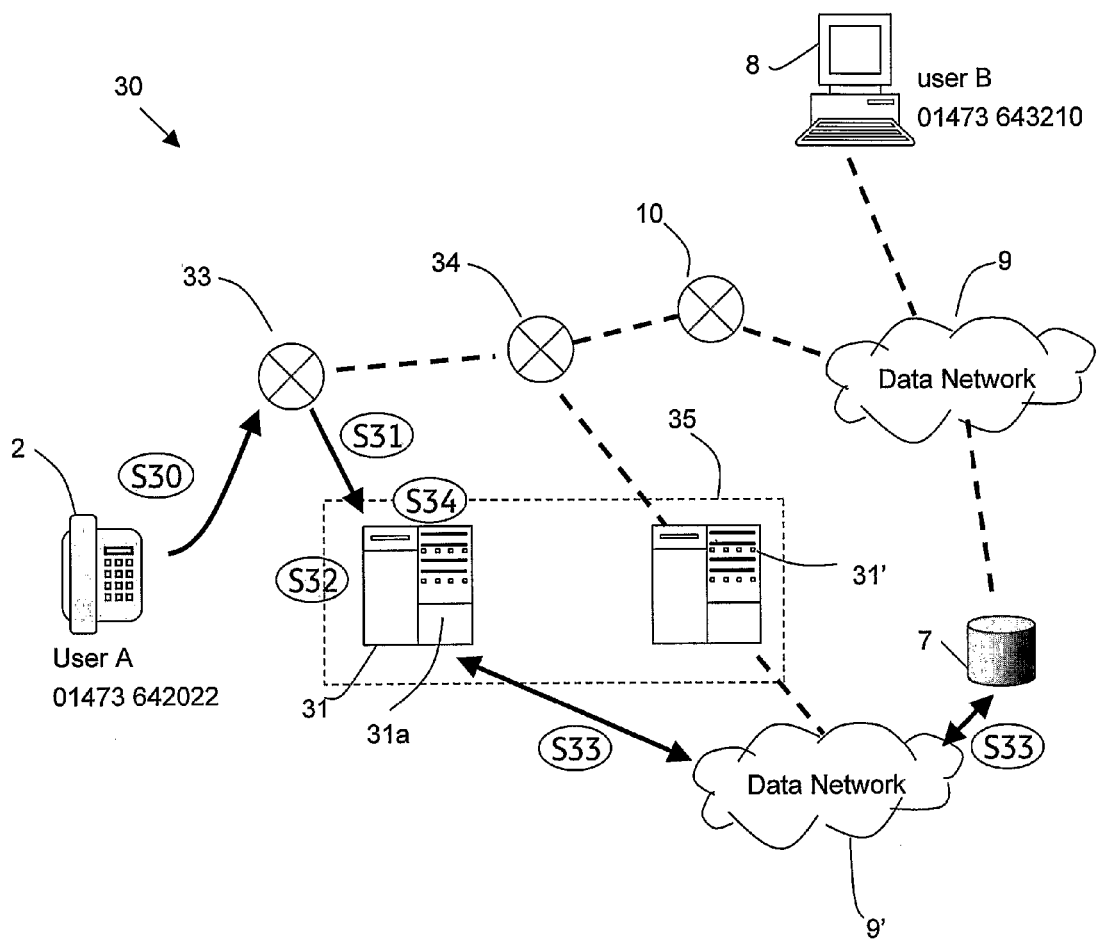
FIG. 9 shows a schematic view of a third system suitable for sending a communication directly to the mailbox of a user.

Whilst FIGS. 2 and 7 showed first and second examples respectively of systems in which a first user can send an audio-visual communication directly to the mailbox of a second user, FIG. 9 shows a further alternative system in which this can be performed. FIGS. 8 and 9 show a third embodiment of a procedure and communication system 30 in which a first user (A) of a communication device 2 can elect to send an audio-visual communication directly to a mailbox 31a of a second user (B). User A's telephone 2 is connected in a conventional manner to a public switched telephone network (PSTN) via a digital local exchange (DLE) 33. The PSTN network comprises a multiplicity of exchanges as is conventionally known in the art, but for clarity only one other is illustrated in FIG. 7, DLE 34.

In step S30, user A decides they would like to leave a voice mail message for user B and uses telephone 2 to dial a three digit prefix [171] followed by the telephone number [01473 643210] they would usually dial to reach user B. The digits are collected by Local Exchange 33 as they are dialled. In step S31, Local Exchange 23 recognises the 171 as a prefix, strips the subsequent 0, and routes the call (with digits 171 1473 643210) to the local instance of mail platform 31, together with the calling party CLI.

In this embodiment, the network has been designed with multiple local instances of mail platforms (for example, 31 and 31'), which co-operate and communicate with each other so as to together form a single virtual mail platform 35. The local instances of the platforms can be connected via any suitable network such as the data network 9' shown in FIG. 9, or via the internet or PSTN network. In this arrangement, whenever an exchange receives a call with the predefined prefix (e.g. 171) it automatically routes that call to it's preferred local instance of the mail platform.

At the mail platform 31, the 171 prefix is recognised as indicating a DMA call, and the platform compares the incoming digits for the called party with locally stored data to check whether this party has subscribed to the direct mailbox access service (step S32). If so, the platform then accesses database 7 via the network 9' to compare the calling party CLI (1473 642022) with the database entries to determine whether the calling party (user A) is allowed direct access to the mailbox of user B (step S33). As described earlier, database 7 is a store which holds a list of caller profiles, including entries which indicate a plurality of users who are allowed or not allowed to send an audio-visual communication directly to the mailbox of B. In this embodiment the database 7 is accessible to the mail platforms via network 9', and is accessible to the software client of computer 8 via the internet 9 to enable updating to be performed. If, at step S33, the mail platform determines that user A is allowed direct access to the mailbox of user B, then at step S34 user A is allowed to leave a voicemail message in mailbox 31*a* of the mail platform.

If, at step S32 the mail platform determines that the called party has not subscribed to the direct mailbox access service then the platform plays an appropriate recorded message to indicate that "the service is not available", and the call is torn down. Similarly, if the mail platform determines at step S33 that user B does not allow DMA calls from user A then the "the service is not available" message is played, and the call is torn down.

In the specific embodiments, it is when user B makes an outgoing phone call that triggers an update to the database. However, it is understood that the outgoing communication is not restricted only to telephone calls, but could instead be any appropriate type of communication. For example, the user might make a video-call, a direct mailbox access call or send an SMS message to any user who they were happy to have on their list of allowed callers. Thus, an entry associated with the user would be entered into the store and any future direct deposit calls from that user would be allowed.

In the specific embodiments, when direct mailbox access (DMA) calls are desired, the user A is described as dialling the prefix plus the full PSTN telephone number (171 01473 643210), i.e. including the "area telephone code" 01473. However, it is understood that this is not essential, since users in the same area can simply dial the shortened version without the "area telephone code" (i.e. dial 171 643210 only). Then, in the system of FIG. 2, when destination Exchange 4 triggers to the Intelligent Network it will relay the full number for the called party, i.e. the CLI in a "normalised format" (e.g. 1473 643210).

It is understood that the use of the prefix "171" throughout this description is just one example of a possible array of digits which may be used to indicate that a user has elected to send an audio-visual communication directly to the mailbox of a second user. This prefix could equally be replaced by any other array of digits, or suitable signal It is understood that whilst the database described in the specific embodiments is represented as a single entity, this could in practice comprise any suitable arrangement of one or more databases which co-operate together to store the user profiles in a convenient and accessible manner.

The invention claimed is:

1. A method of operating a communications system in which a first user can elect to send an audio-visual communication directly to a mailbox of a second user, the method comprising the steps of:
   (a) maintaining a store associated with the second user, the store comprising entries indicating a plurality of other users who are allowed or not allowed to send an audio-visual communication directly to the mailbox of the second user;
   (b) upon sending of a communication from the second user to any destination user, automatically performing a store modification procedure with respect to the entry associated with the destination user;
   (c) upon receiving a request from the first user desiring to send an audio-visual communication directly to the mailbox of the second user:
   checking the store to determine whether the first user is a user who has previously received a communication from said second user to determine if the first user is allowed to send an audio-visual communication directly to the mailbox of the second user; and accordingly allowing or not allowing the communication to the mailbox.

2. A method according to claim 1, in which the store modification procedure comprises adding into the store an entry associated with the destination user.

3. A method according to claim 1, in which the step in (b) of sending a communication from the second user to any destination user comprises associating with the communication a signal caused by the second user, the signal indicating whether or not the destination user is allowed to send an audio-visual communication directly to the mailbox of the second user.

4. A method according to claim 1, in which the store modification procedure comprises:
   detecting a signal associated with the communication that indicates whether the destination user is to be allowed to send audio-visual communications directly to the mailbox; and
   performing subsequent steps in the store modification procedure on the basis of that signal.

5. A method according to claim 3, in which the signal comprises an inhibition signal which indicates that the second user does not want the destination user to be allowed to send audio-visual communications directly to the mailbox; and the subsequent steps in the store modification procedure comprises inhibiting any amendment of the store.

6. A method according to claim 1, further comprising the step of using a web application to remotely access and modify the store.

7. A communications system in which a first user can elect to send an audio-visual communication directly to a mailbox of a second user, the system comprising:
   (a) a store associated with the second user, the store comprising entries indicating a plurality of other users who are allowed or not allowed to send an audio-visual communication directly to the mailbox of the second user;
   (b) a device associated with the second user, the device being arranged to send a communication from the second user to any destination user, and upon such sending the device being further arranged to automatedly perform a store modification procedure with respect to the entry associated with the destination user; and
   (c) the system being arranged, upon receiving a request from the first user desiring to send an audio-visual communication directly to the mailbox of the second user, to check the store to determine whether the first user is allowed to send an audio-visual communication directly to the mailbox of the second user; and the system accordingly allowing or not allowing the communication to the mailbox.

8. A system according to claim 7, in which the store modification procedure comprises adding into the store an entry associated with the destination user.

9. A system according to claim 7, in which the device in (b) is arranged, when sending a communication from the second user to any destination, to associate with the communication a signal caused by the second user, the signal indicating whether or not the destination user is allowed to send an audio-visual communication directly to the mailbox of the second user.

10. A system according to claim 7, in which the store modification procedure comprises:

detecting a signal associated with the communication that indicates whether the destination user is to be allowed to send audio-visual communications directly to the mailbox; and performing subsequent steps in the store modification procedure on the basis of that signal.

11. A system according to claim 9, in which the signal comprises an inhibition signal which indicates that the second user does not want the destination user to be allowed to send audio-visual communications directly to the mailbox; and the subsequent steps in the store modification procedure comprises inhibiting any amendment of the store.

12. A system according to claim 7, further comprising a web application arranged to allow a user to remotely access and modify the store.

13. A storage medium carrying computer readable code representing instructions for causing at least one processor to perform the method according to claim 1 when the instructions are executed by the at least one processor.

14. A method of controlling the access a calling party has to the communications message store of a called party, the method comprising the following steps:

determining the identity of the calling party;

determining from one or more stored records of identities associated with the communications store, if the identity of the calling party is an identity entitled to have direct access to the communications message store, wherein each of said one or more stored records is associated automatically with the identity of a party previously called by the called party; and if the identity of the calling party is not associated in any one of said stored records, preventing the calling party from storing a communications message in said communications message store.

15. A method as claimed in claim 14, wherein said communications message store is a multi-media communications mail-box.

16. A method as claimed in claim 14, wherein each stored record contains information identifying the party previously called by the called party which was captured automatically while on-ward connecting a call from the called party to the party.

* * * * *